Feb. 2, 1937. L. GARY ET AL 2,069,606
DEVICE FOR BLEEDING HYDRAULIC BRAKES
Filed April 17, 1936
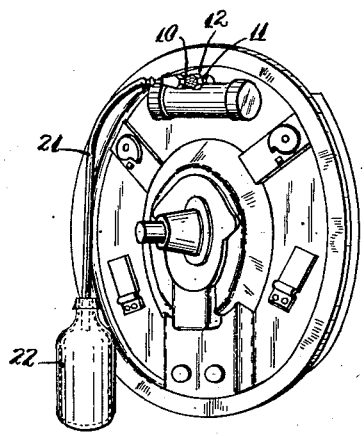
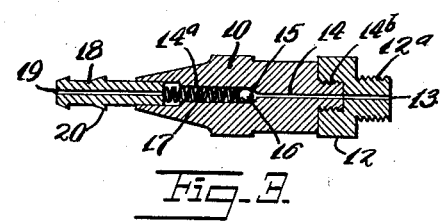
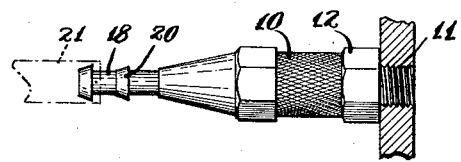
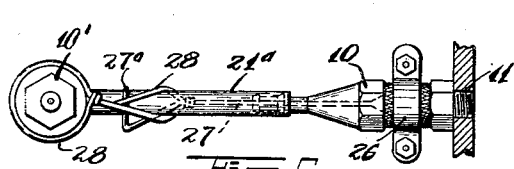
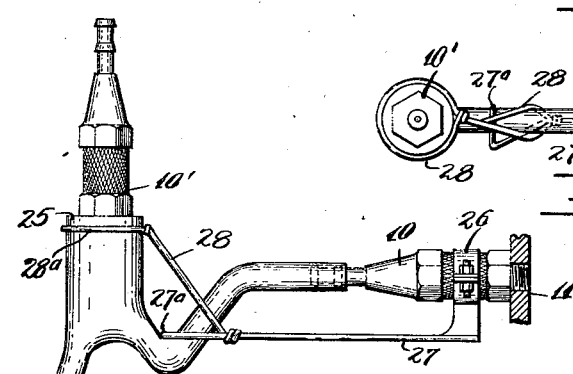
INVENTORS
Louis Gary
James V. Sabella
BY
ATTORNEY Patented Feb. 2, 1937

2,069,606

UNITED STATES PATENT OFFICE 2,069,606

DEVICE FOR BLEEDING HYDRAULIC BRAKES

Louis Gary and James V. Sabella, New York, N. Y., assignors to Solo Automotive Manufacturing Company, Inc., New York, N. Y.

Application April 17, 1936, Serial No. 74,997

4 Claims. (Cl. 188—152)

This invention relates to new and useful improvements in a device for bleeding hydraulic brakes for vehicles.

The invention has for an object the construction of a device which is characterized by the fact that when it is used it requires but one man to bleed hydraulic brakes. Heretofore, it was necessary for one man to operate the foot pedals on the brakes while another took care of the bleeding operation.

Specifically, the invention contemplates the provision of a hollow body adapted to be mounted on the bleeder connection of a hydraulic brake system and associated with a one way valve and a pipe line in a manner so that the bleeded fluid and air may pass in one direction only. It will therefore be noted that the bleeding apparatus requires no attention, so that a mechanic may operate the foot pedal without assistance.

A further object of the invention is to provide an adapter for the hollow body by which it may be adapted to various types and designs of hydraulic brakes.

Still further the invention contemplates the provision of an outlet valve associated with the pipe line so that accumulated air may be released into the atmosphere. This eliminates any possibility of the accumulated air returning into the hydraulic brake system.

A further object of the invention resides in the provision of means for properly holding portions of the pipe line to prevent the return of air into the hydraulic brake system.

Another object is the construction of an article as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of the wheel side of internal type brake mechanism with the shoes removed, and bleeding mechanism according to this invention shown applied thereto.

Fig. 2 is a side elevational view of the body which contains the one way valve, illustrated per se.

Fig. 3 is a longitudinal sectional view of Fig. 2.

Fig. 4 is a perspective view of the body per se.

Fig. 5 is a fragmentary side elevational view of a device constructed according to a modification of the invention.

Fig. 6 is a plan view of Fig. 5.

The device for bleeding hydraulic brakes, according to this invention, comprises a hollow body 10 adapted to be mounted upon the bleeder connection 11 of a hydraulic brake system. In Fig. 1 the wheel side of an internal type brake is illustrated with the shoes removed so that the bleeder connection may be distinctly seen. The hollow body 10 is connected with an adapter 12, which in turn threadedly engages into the bleeder connection.

The adapter 12 has an opening 13 which communicates with an opening 14 in the body 10. This opening 14 at the inner portion is formed with a seat 15 upon which a ball valve 16 is disposed. The seat portion 15 is in communication with an enlarged central passage 14ᵃ in which a spring 17 is housed. This spring acts against a stem 18, inserted into the extremity of the body 10. The spring 17 engages the ball valve 16 and maintains it on its seat. A passage 19 is formed through the stem 18. The stem has several peripheral flanges 20 upon which the end of a rubber hose 21 may be forced and frictionally maintained in position.

The adapter 12 has a threaded external end 12ᵃ adapted to engage into a threaded opening 11 in the bleeder connection of the brake cylinder. The inner extremity of the body 10 is formed with a threaded portion 14ᵇ which threadedly engages into the outer end of the adapter 12ᵃ. The pipe 21 extends downwards and into a receiving receptacle 22.

According to this invention the brakes are bled in a manner substantially identical to the conventional methods now in use. The brake fluid is supplied to the braking system either from the conventional container on the dashboard of the vehicle or from an auxiliary supply. It is permitted to pass through the braking system and the fluid which contains the air will be discharged out through the body 10, through the pipe 21 and into the receptacle 22. The pipe line 21 fits freely into the neck of the container 22 (see Fig. 1) to allow the air to escape therefrom. The mechanic is free to operate the foot pedal of the braking system and may depend upon the one way valve 16 for preventing the re-entrance of air into the braking system.

In Figs. 5 and 6 a modification of the invention has been disclosed in which an air outlet valve 10' is provided to permit the escape of air from the bled fluid to the atmosphere. This insures against the possible re-entrance of the air into the braking system. More specifically, the device includes a pipe 21ᵃ which has an auxiliary top outlet 25 upon which the one way valve 10' is mounted. This one way valve comprises the valve body and the mechanism illustrated in Fig. 3 within the valve body. It should be noted that the valve body 10' is set so that the discharge end is at the top. A means is provided for holding the valve 10' materially above the bleeder connection. This is accomplished by a clamp 26 secured about the body of the valve 10' and supporting a rod 27. The outer end of the rod has a portion 27ᵃ turned at right angles thereto and acting against a portion of the pipe 21ᵃ and holding this portion downwards. Braces 28 are connected with the arm 27 and have an encircling portion 28ᵃ around the top of the pipe portion 25.

The fluid which discharges from the valve 10 necessarily follows the contour of the pipe 21ᵃ until it discharges into the container 22. Since a portion of the pipe is held downwards by the finger 27ᵃ the pipe has a function of a liquid drip. The larger portion of the liquid passing through the system will discharge into the receptacle 22 and any air which may be liberated therefrom will travel upwards and out from the valve 10'. If not for the valve there may be a tendency that some of the liberated air might pass back into the brake system.

While we have illustrated and described the preferred embodiments of our invention it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:—

1. A device for bleeding hydraulic brakes for vehicles, comprising a bleeder connection of a hydraulic brake system a hollow body adapted to be mounted on said bleeder connection, a pipe line connected with said body for discharging into a receiving receptacle, a one way valve on said body for preventing air from being drawn in through said pipe line, and an air valve associated with said pipe line to permit the escape of air which may filter out from the fluid to the atmosphere.

2. A device for bleeding hydraulic brakes for vehicles, comprising a bleeder connection of a hydraulic brake system a hollow body adapted to be mounted on said bleeder connection, a pipe line having an upward projected portion and connected with said body for discharging into a receiving receptacle, a one way valve on said body for preventing air from being drawn in through said pipe line, and an air valve associated with said pipe line to permit the escape of air which may filter out from the fluid to the atmosphere, said air valve being located in said upward projected portion of said pipe line.

3. A device for bleeding hydraulic brakes for vehicles, comprising a bleeder connection of a hydraulic brake system a hollow body adapted to be mounted on said bleeder connection, a pipe line having an upward projected portion and connected with said body for discharging into a receiving receptacle, a one way valve on said body for preventing air from being drawn in through said pipe line, and an air valve associated with said pipe line to permit the escape of air which may filter out from the fluid to the atmosphere, said air valve being located in said upward projected portion of said pipe line, a clamp mounted on said hollow body, a rod connected with said clamp and engaging a portion of said pipe for holding the portion slightly extended downwards to form a fluid trap.

4. A device for bleeding hydraulic brakes for vehicles, comprising a bleeder connection of a hydraulic brake system a hollow body adapted to be mounted on said bleeder connection, a pipe line having an upward projected portion and connected with said body for discharging into a receiving receptacle, a one way valve on said body for preventing air from being drawn in through said pipe line, and an air valve associated with said pipe line to permit the escape of air which may filter out from the fluid to the atmosphere, said air valve being located in said upward projected portion of said pipe line, a clamp mounted on said hollow body, a rod connected with said clamp and engaging a portion of said pipe for holding the portion slightly extended downwards to form a fluid trap, and braces being connected with the rod and said projected portion to hold the projected portion materially above the bleeder connection.

LOUIS GARY.
JAMES V. SABELLA.